3,152,667
METERING PIN FOR SHOCK ABSORBERS
Richard G. Powell, South Bend, Ind., assignor to The Bendix Corporation, South Bend, Ind., a corporation of Delaware
Filed Jan. 26, 1962, Ser. No. 169,014
2 Claims. (Cl. 188—100)

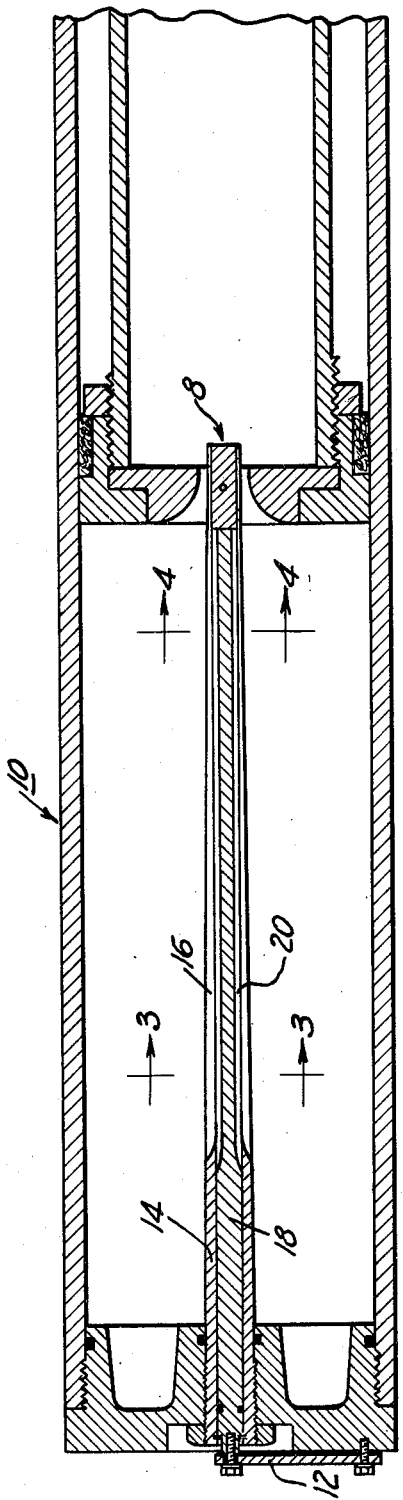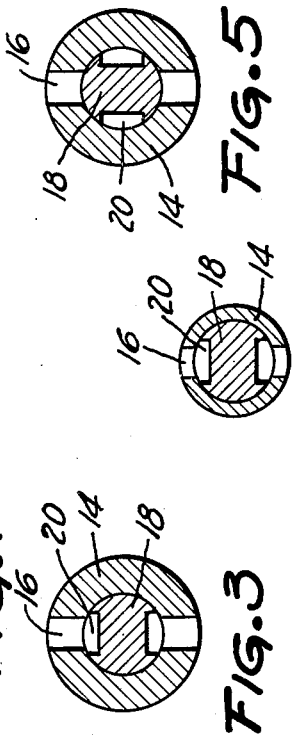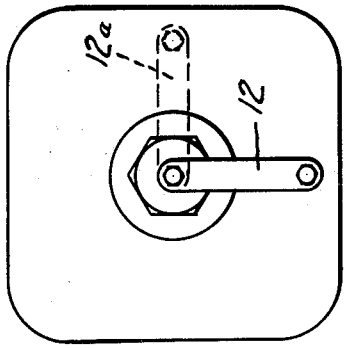
Oct. 13, 1964     R. G. POWELL     3,152,667
METERING PIN FOR SHOCK ABSORBERS
Filed Jan. 26, 1962
INVENTOR.
RICHARD G. POWELL
BY
ATTORNEY United States Patent Office 3,152,667
Patented Oct. 13, 1964

This invention relates to a metering pin for controlling flow between chambers. In more detail this invention relates to a two-piece relatively rotatable concentric rod used as a metering pin.

More specifically, it is an object of this invention to provide means for varying shock absorber characteristics depending on whether firm, soft or intermediate shock absorber action is desired.

A further object is to provide a means which can increase the versatility of any shock absorber by allowing a choice between firm, soft or intermediate shock absorbing action.

Another object is to provide a novel means for effecting energy dissipation characteristics of a shock absorber.

A still further object of this invention is to provide a means of varying the resistance of a variable orifice shock absorber such that the shock absorber will perform efficiently at two or more given load or energy conditions.

Other and further objects and advantages inherent in a construction embodying the invention will become readily apparent in the following description and drawing in which:

FIGURE 1 is a section of the side view of a shock absorber having a metering pin in accordance with the present invention;

FIGURE 2 is an end view of a shock absorber containing a metering pin of the present invention showing a means of adjustment for said metering pin;

FIGURE 3 is a detailed, transverse section taken along line 3—3 of FIGURE 1 showing the metering pin slots in registry;

FIGURE 4 is a similar transverse section as presented by FIGURE 3, but taken along line 4—4 of FIGURE 1 showing the slots in registry in the tip region;

FIGURE 5 is a detailed, transverse section of the metering pin depicted by FIGURE 1 showing the slots out of registry in the high load position; and FIGURE 6 is a side view of a modified metering pin in accordance with the present invention.

As is readily appreciated by those skilled in the art, the accepted use of an orifice with a tapered metering pin sliding through it is to vary the resistance of a shock absorber in proportion to its stroke. The metering pin is designed on the basis of closure velocities anticipated at various locations throughout the stroke of the unit. The standard metering pin can be designed to operate at a high efficiency under a given load condition, but at lower loads, it becomes less efficient.

According to this invention, and with particular reference to the drawing, a metering pin 8 is associated with a shock absorber 10 in a familiar fashion such as the shown method of mounting it with the end cap of said shock absorber. This is not, however, to be considered a limiting environment as it is well within the scope of this invention to control flow in other devices such as fuel controls, etc. utilizing metering pins.

As may be also observed from FIGURES 1 and 2, a manually operated lever 12 is shown to be adapted to control the metering pin 8 to adapt the shock absorber for light, heavy or intermediate loads. However, it may be readily appreciated that various means can be utilized to perform this adjustment automatically, and it is not to be construed that this invention is to be limited to the manually operated means shown. Such automatic means, not shown, may be tied in with means to sense the weight of a vehicle with which the shock absorber 10 is associated to thus provide a metering pin change in accordance with the mass load. Such a system of sensing the weight of a vehicle and providing a control signal or force is well known and may be readily adapted by those skilled in the art to the metering pin 8 as presented by this invention.

The metering pin 8 of the present invention may be more particularly described as including an external sleeve 14 having a longitudinal slot 16 and surrounding or incasing an internal member 18 having a longitudinal slot 20 of uniform depth. As is seen in FIGURE 1, the external sleeve 14 is of a tapered form to present a gradually changing orifice area as the stroking of the shock absorber 10 takes place. The taper of the sleeve 14 may be one of a gradual nature or one of a step or varying nature. In addition, the internal slot may be tapered as is shown by FIGURE 6 for a modified metering pin consisting of sleeve 14a with slot 16a and pin 18a with the tapered slot 20a. The tapered slot 20a would in effect create a changing rate of the change of orifice area. The direction of taper of the slot 20a does not have to be that as shown by FIGURE 6 nor does the taper have to be gradual for a taper from root to end as well as a stepped taper is within the realm of this invention.

As for the operation of the device presented by this invention, it is to be first recognized that all orifices which are varied in area by a tapered metering pin utilize a small percentage of the total area which is fixed or constant. In this regard, the constant area of the metering pin is formed by a slot 16 in the outside member or the sleeve 14 of the metering pin 18. However, this constant area with regard to a pin having an internal tapered slot 20a is dependent not only on slot 16 but on the taper of sleeve 14 and the taper of the internal slot 20a. It is thus readily appreciated that the calculated variable area is then accomplished by the consideration not only of the taper of the outside diameter of the sleeve, but with regard to the slots as well.

When the load requirement increases for the shock absorber 10 and the adjusting handle 12 is moved to a heavy load position 12a, as shown by the dotted lines in FIGURE 2, the combined slotted area, which area includes slot 16 and slot 20 of the internal member 18, is decreased by the cross sectional area of the slot 20 of the internal member 18.

This adjustment is readily apparent in FIGURES 3 and 5, showing in FIGURE 3 the alignment of slots 16 and 20, and in FIGURE 5 the misalignment of said slots, with the misaligned position forming the heavy load position. In addition, it is conceivable that with proper location of the slots on the internal member, three or more adjustments could be made in place of the two shown. Similarly, the slots could be partially aligned to provide an intermediate position as above mentioned.

It is to be understood that the present invention is susceptible of various modifications and adaptations other than herein described and shown and that it is only limited by the scope of the appended claims.

I claim:
1. For use with a shock absorber having telescoping sections with a movable wall defining variable volume chambers, which movable wall is provided with an orifice to communicate the variable volume chambers, a means for varying the area of said orifice as said telescoping sections are moved in response to a load, said means comprising in combination:
   a tapered sleeve mounted to one of said sections and closed at the opposite end, which closed end, when said telescoping sections are extended, projects into said orifice of said movable wall, said sleeve being provided with axial slots of constant width in the sidewalls thereof;

a tapered rod rotatably mounted to said one of said sections mounting said tapered sleeve to be coextensive with said sleeve with the end of said tapered rod forming the other end closure for said sleeve and providing an end bearing support for said rod in said sleeve, said rod being provided with constant width, axial grooves coextensive with said slots of said sleeve; and a means to rotate said rod within said sleeve to align or misalign said grooves and said slot, which means is located exteriorly of said one of said sections mounting said rod and said sleeve.

2. A means for varying the resistance of a shock absorber having a variable orifice, which means comprises:

a metering pin controlling said orifice area throughout stroking of said shock absorber, said metering pin including a tapered outer sleeve having axially extending slots of constant width from end to end through the walls of said sleeve, and a tapered rod enclosed by and coextensive with said sleeve, said rod being rotatably supported within said sleeve and forming an end closure for said sleeve, said rod also being axially grooved coextensively with said slots of said sleeve, which grooves are of constant width but vary in depth from one end of said rod to the other; and means adapted to rotate said rod within said sleeve to vary the registry of said slots and said grooves to vary the effective area of said orifice in accordance with the position of said metering pin within said orifice.

References Cited in the file of this patent
UNITED STATES PATENTS

| | | |
|---|---|---|
| 1,178,688 | Stronach | Apr. 11, 1916 |
| 1,635,284 | Lomar | July 12, 1927 |
| 1,776,388 | Lomar | Sept. 23, 1930 |
| 2,003,823 | Bucklen et al. | June 4, 1935 |
| 2,167,928 | Johnson | Aug. 1, 1939 |
| 2,895,735 | Bartlett | July 21, 1959 |

FOREIGN PATENTS

| | | |
|---|---|---|
| 361,521 | Great Britain | Nov. 26, 1931 |
| 585,681 | Great Britain | Feb. 19, 1947 |
| 822,278 | France | Sept. 13, 1937 |